US007293478B2

(12) United States Patent
Kudo et al.

(10) Patent No.: US 7,293,478 B2
(45) **Date of Patent: *Nov. 13, 2007**

(54) METHOD FOR TESTING A FOAM DELIVERY SYSTEM ON A VEHICLE

(75) Inventors: Rance Tetsuo Kudo, Oxnard, CA (US); Raymond John Cappillino, Oxnard, CA (US); Jesse Lynn McNolty, Santa Paula, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 539 days.

This patent is subject to a terminal disclaimer.

(21) Appl. No.: 11/001,615

(22) Filed: Nov. 24, 2004

(65) Prior Publication Data

US 2006/0107757 A1 May 25, 2006

(51) Int. Cl.
*G01N 19/00* (2006.01)

(52) U.S. Cl. .................................. 73/865.9; 73/861.79

(58) Field of Classification Search ................ 73/865.9
See application file for complete search history.

(56) References Cited

U.S. PATENT DOCUMENTS

| | | | | |
|---|---|---|---|---|
| 6,588,286 | B1 * | 7/2003 | Kudo et al. | 73/861.79 |
| 6,615,675 | B1 * | 9/2003 | Kudo et al. | 73/861.79 |
| 6,715,373 | B2 * | 4/2004 | Kudo et al. | 73/865.9 |
| 6,739,174 | B2 * | 5/2004 | Kudo et al. | 73/1.01 |

* cited by examiner

*Primary Examiner*—Harshad Patel
(74) *Attorney, Agent, or Firm*—David S. Kalmbaugh

(57) ABSTRACT

A method which permits the environmentally safe testing of the Aircraft Rescue and Fire Fighting vehicle's foam delivery system by using a surrogate fluid to test the foam delivery system. The method uses piping, valves, and connecting elements to interface with the fire vehicle's foam delivery system, while minimizing the release of Aqueous Film Forming Foam (AFFF) to the environment.

20 Claims, 6 Drawing Sheets

METHOD FOR TESTING A FOAM DELIVERY SYSTEM ON A VEHICLE

BACKGROUND OF THE INVENTION

1. Field of the Invention

The present invention relates generally to fire fighting systems for use in fighting and extinguishing hydrocarbon and other flammable liquid fires. More particularly, the present invention relates to a foam free test system for the environmentally safe testing the foam delivery systems used on the T1500 and T3000 Aircraft Rescue and Fire Fighting (ARFF) vehicle.

2. Description of the Prior Art

Currently, fire fighting guidelines and policies require quarterly and annual Aqueous Film Forming Foam (AFFF) discharge tests on all Aircraft Rescue and Fire Fighting (ARFF) vehicles. The foam discharge test verifies that the on-board foam delivery system is functioning properly, thereby ensuring a vehicle's fire fighting equipment is operational when called upon to save lives and property.

The method presently in use for determining fire fighting vehicle performance in the field is to discharge foam through each of the vehicle's nozzles and then collect foam samples in accordance with the National Fire Protection Association (NFPA) 412 Standard for Evaluating Aircraft Rescue and Fire Fighting Foam Equipment. Each vehicle is equipped with at least two and up to five different types of nozzles, depending on the vehicle type. This procedure generates large amounts of AFFF wastewater. Depending on the type of vehicle, the generated AFFF wastewater volume may be anywhere from 850 gallons to more than 2,600 gallons per vehicle for each 30-second nozzle foam discharge test. This includes flushing the system with water as required under the guidelines of NFPA 412. At present, the Department of Defense (DOD) agencies have more than 1,200 ARFF vehicles in the fire fighting arsenal inventory at more than 240 activities. The net result is the testing of fire fighting vehicles generates a substantial amount of AFFF wastewater annually.

Fire fighting personnel often conduct routine daily, weekly or monthly AFFF discharge testing, in addition to the mandated requirements, due to low confidence in the performance of the fire fighting vehicle's foam delivery system. The routine testing is a visual check of foam being emitted through the various nozzles of the vehicle. It is estimated that a minimum of 5 seconds is required for the fire fighter to verify that foam is being emitted through a single nozzle. Depending on the type of vehicle, these 5 second routine checks, with system flush, generates 500 to 1,500 gallons of AFFF wastewater per ARFF vehicle. These routine foam delivery system tests generate significant amounts of AFFF wastewater, which result in environmental damage.

Despite its wide use and effectiveness for fire fighting, AFFF poses an environmental problem because of its resistance to biodegradation, its toxicity due to constituents butyl carbitol (a glycol ether) and perfluorooctyl sulfonates (PFOS), its high biochemical oxygen demand (BOD), and its chemical oxygen demand (COD).

In addition to the environmental concerns with respect to AFFF wastewater discharges into the environment, the significant foaming capacity of AFFF makes the recovery and treatment of spent AFFF very difficult. In some regions, the military is no longer allowed to discharge AFFF wastewater to industrial waste treatment plant facilities because of subsequent treatment plant fouling and damage. Hence, when disposing of AFFF wastewater, the military incurs additional cost associated with hazardous waste handling, collection, disposal, and issues relating to liability for environmental and other damage.

SUMMARY OF THE INVENTION

The NoFoam system for testing the foam delivery system on the T1500 and T3000 fire fighting vehicle comprises a control panel having a flow meter, flow sensor piping and valves, and a holding tank for an environmentally safe surrogate fluid mounted on a portable trailer/stationary-pad. The fire fighter simply drives the vehicle to be tested to the mobile/stationary-pad NoFoam system and connects to the delivery system's fluid supply line. At this point, the user continues through the T1500 and T3000 fire fighting foam discharge procedures. A flow meter installed in the NoFoam system senses the flow rate of the surrogate fluid and allows the user to read a display for the flow meter. The fire fighter simply reads the monitor and quickly determines the vehicle's foam delivery system performance. The flow that is monitored represents the flow rate of the AFFF concentrate into the vehicle's foam delivery system. The use of a dye-water solution allows the user to visually inspect the vehicle's performance, although the NoFoam system still performs adequately without the dye concentrate. The dye concentrate selected is an environmentally benign, biodegradable dye, certified by the National Sanitation Foundation (NSF) International to NSF Standard 60 for the use in potable water (Drinking Water Treatment Chemicals Health Effects), and DOD adopted industry standard issued by the American National Standard Institute.

DETAILED DESCRIPTION OF THE PREFERRED EMBODIMENTS

Figure 1:
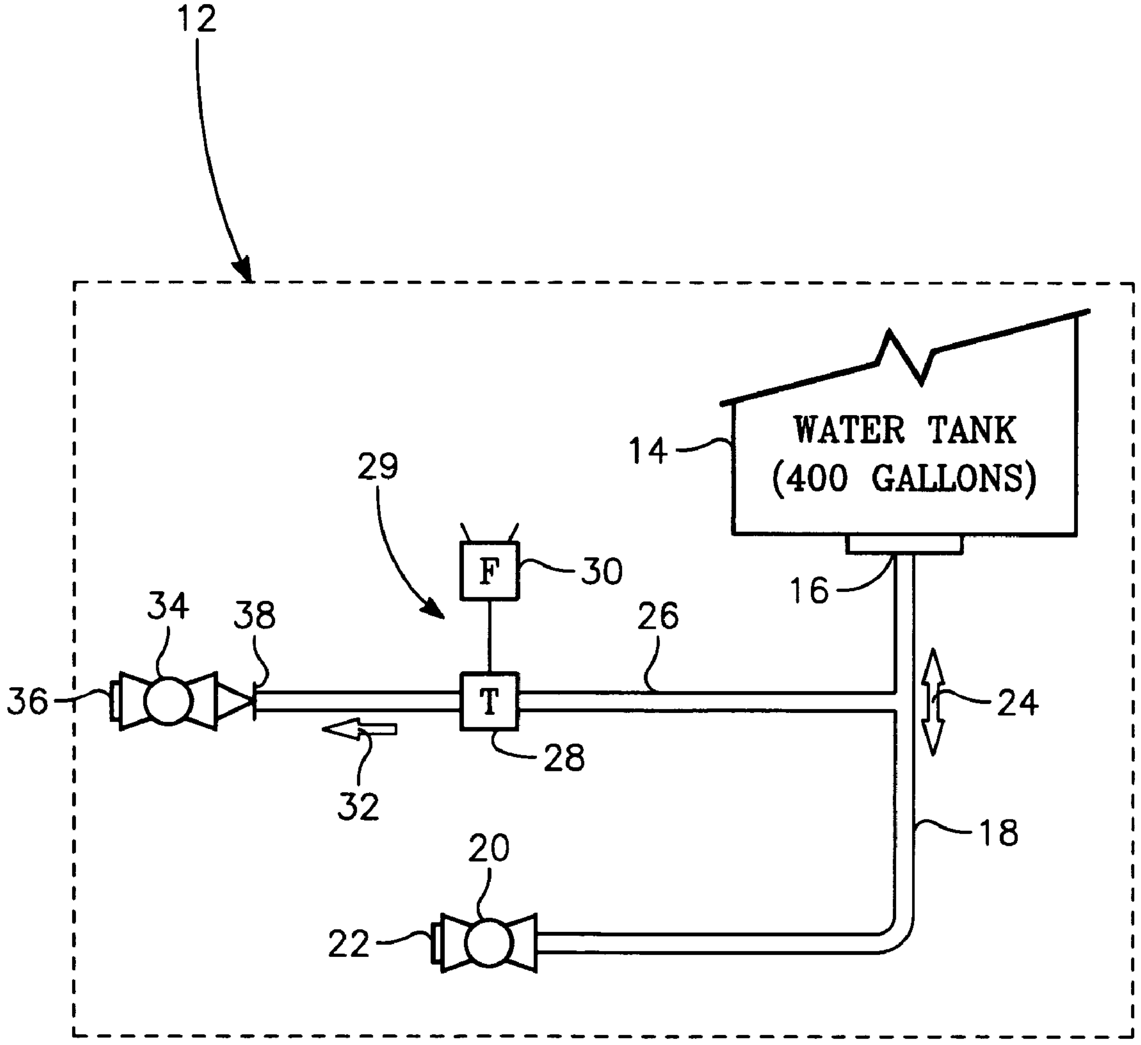
FIG. 1 illustrates a detailed fluid flow diagram for the stationary pad/trailer used in the preferred embodiments of the present invention.
Figure 2:
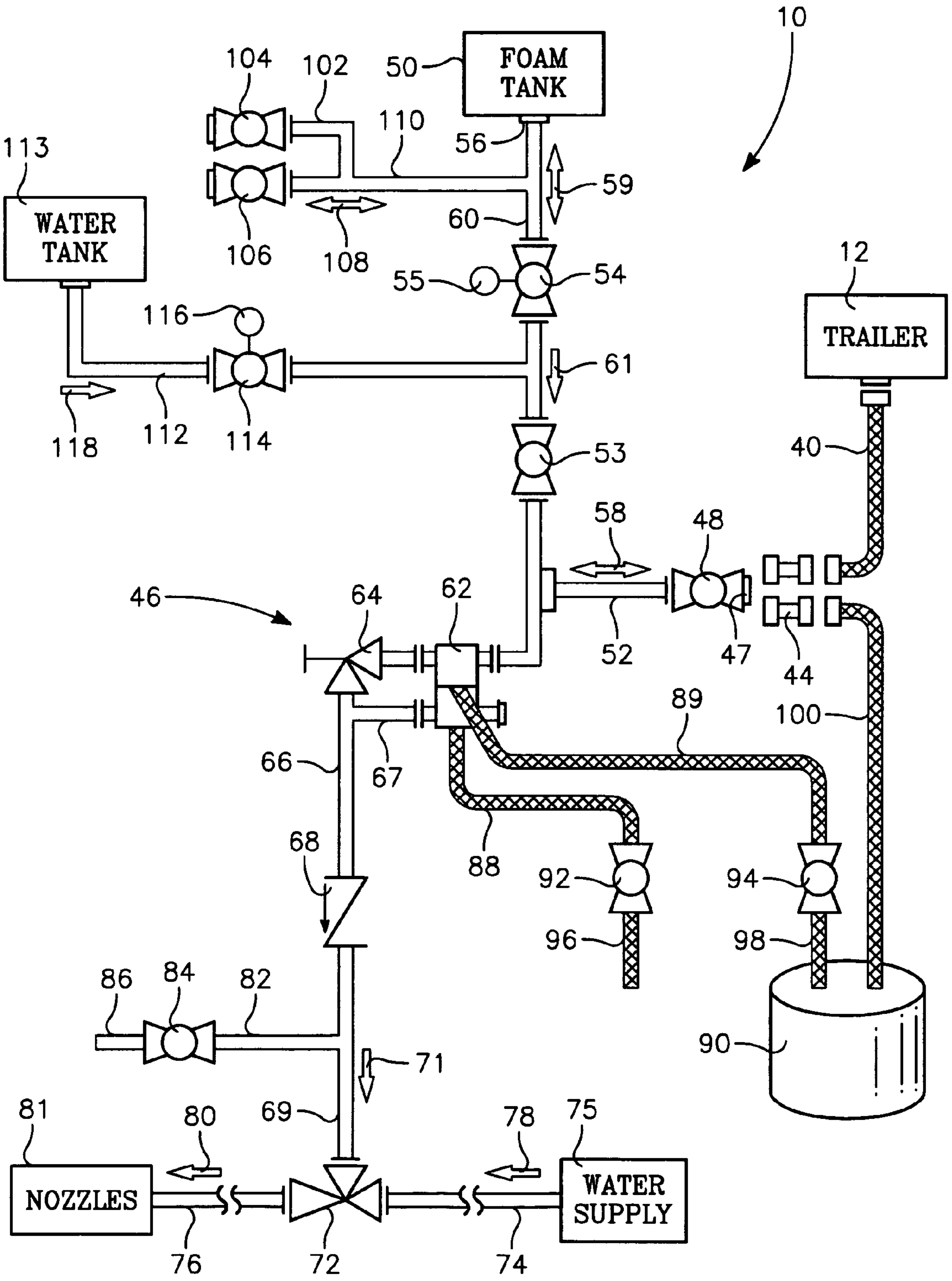
FIG. 2 illustrates a detailed fluid flow schematic diagram of the NoFoam system for the testing of a foam delivery system on a T1500 fire fighting vehicle.

Referring first to FIGS. 1 and 2, the NoFoam system, designated generally by the reference numeral 10, permits the testing of the T1500 Aircraft Rescue and Fire Fighting (ARFF) vehicle's foam delivery system, which includes the delivery system's piping, valves, pump, proportioner, educator, and nozzles, while minimizing the release of Aqueous Film Forming Foam (AFFF) to the environment. An environmentally benign surrogate fluid is used for testing, enabling a user to validate the readiness of the vehicle's fire fighting equipment. The NoFoam system complies with the NFPA 414 Standard for Aircraft Rescue Fire Fighting Vehicles, which allows for the use of dye-water in Foam Distribution System Pump Testing and Flushing System Testing of ARFF vehicles.

The NoFoam system 10 includes a trailer/stationary-pad 12 which allows the user to transport the system 10 to a location at a facility where fire fighting vehicles are normally tested. Trailer/stationary-pad 12 has a 400 gallon water tank 14 mounted thereon. The water tank 14 is filled with approximately 400 gallons of water to test the fire fighting vehicle's foam delivery system. A fluorescent yellow/green dye or any other color dye is then added to the water which results in a highly visible dye-water flowing from the water tank 14. The color of the dye added depends upon user requirements.

The water tank 14 includes an opening or discharge port 16 at its bottom end. A 2 inch IPS (Iron Pipe Size) pipe 18 connects the opening 16 at the bottom of tank 14 to a first inlet/outlet port of a 2 inch IPS ball valve 20 which is manually opened and closed by a user of system 10. The second inlet/outlet port of ball valve 20 includes a 2½ inch IPS water fill and drain connector 22 which allows the user to connect an external water source to ball valve 20 to fill tank 14. The user can also connect a drain hose to ball valve 20 to drain tank 14. Arrow 24 indicates that fluid flow through pipe 18 can be in either direction.

Branching at angle of approximately 90° from pipe 18 is a 1¼ inch IPS pipe 26 which includes the paddle wheel flow transmitter 28 of a fluid flow sensor 29. A flow indicator 30 for sensor 29, which is electrically connected to transmitter 28, allows the user to observe the flow rate of dye-water from tank 14. The direction of dye-water flow through the fluid flow meter is indicated by arrow 32. The open end of pipe 26 is connected to a 1½ inch IPS ball valve 34 by a 1½ inch IPS×1¼ inch IPS reducer 38.

Valve 34 includes a hose connector 36 at its outlet port. One end of a flexible hose 40 is connected to the hose connector 36 for valve 34. Flexible hose 40 is a 1½ inch ID hose.

At this time it should be noted that trailer 12 is adapted for use with the T3000 and P23 Aircraft Rescue Fire Fighting Vehicles as well as the T1500 Aircraft Rescue Fire Fighting Vehicle.

The other end of flexible hose 40 is connected to hose connector 47 for ball valve 48 by a hose connector fitting 44.

Ball valve 48 is a manually operated valve and is a valve which when open operates as a fill valve or a drain valve. When valve 48 is operating as a fill valve, dye concentrate under pressure is flowing from tank 14 through valve 48 to the nozzles 81 for the T1500 fire fighting vehicle being tested. When valve 48 is operating as a drain valve, valve 48 is used to drain AFFF concentrate from the AFFF tank 50. An arrow 58 indicates that fluid flow through pipe 52 is in both directions.

A 1½ inch IPS pipe 52 connects ball valve 48 to the AFFF concentrate's flow line pipe 60. Flow line pipe 60 is a 2½ inch IPS pipe. One end of flow pipe 60 is connected to the discharge port 56 for storage tank 50, while the other end of flow pipe 60 is connected to the inlet port for a multi-metering manifold valve 62. Multi-metering valve 62 has a bypass 64 connected to its discharge ports.

AFFF concentrate storage tank 50, which is the storage tank for AFFF concentrate on the T1500 fire fighting vehicle, has at its bottom end discharge port 56 through which AFFF concentrate flows when ball valve 54 with a pneumatic operator 55 is open.

A 2 inch IPS flow pipe 66 connects bypass 64 to the inlet port of a spring check valve 68. A flow pipe 67, which branches from pipe 66, terminates at one of the discharge ports of multi-metering manifold valve 62. A 2 inch IPS flow pipe 69 connects the outlet port of check valve 68 to the first inlet port of an eductor 72. A 1½ inch IPS water supply line 74 supplies water from a water supply tank 75 through a pump (not illustrated) to the eductor 72 which converts pressure to kinetic energy, creating a vacuum that sucks the AFFF concentrate/surrogate fluid into the eductor 72. The educator 72 mixes the AFFF concentrate/surrogate fluid with the pressurized water discharging the mixture through the discharge port of eductor 72. A 3 inch IPS pipe 76 connects the discharge port of eductor 72 to nozzles 81.

Pipe 76 provides the fluid flow path from the discharge port of educator 72 to the nozzles 81 for the T1500 fire fighting vehicle. The flow direction for the pressurized water supplied to eductor 72 is indicated by arrow 78, while the flow direction for the resulting water AFFF concentrate/surrogate fluid mixture is indicated by arrow 80. The direction of fluid flow through the lower portion of flow pipe 60 and flow pipes 66 and 69 to eductor 72 is indicated by arrow 71. Check valve 68 insures that fluid flow through pipes 66 and 69 to eductor 72 is in the direction indicated by arrow 71.

Branching from flow pipe 69 is a ⅜ inch ID flexible hose which connects the inlet port of a ball valve 84 to flow pipe 69. Connected to the discharge port of ball valve 84 is a flexible drain hose 86. Ball valve 84 when open allows water, dye-water solution and AFFF concentrate to be drained from flow pipe 69. Flow pipe 66 is located at a low point in the fire fighting vehicle's foam delivery system 46.

A pair of ⅜ inch ID flexible drain hoses 88 and 89 each have one end connected to multi-metering manifold valve 62. The opposite end of drain hose 88 is connected to the inlet port of a multi-metering manifold drain valve 92, while the opposite end of drain hose 89 is connected to the inlet port of a multi-metering manifold drain valve 94.

There is also a flexible hose 96 which has one end connected to the outlet port for drain valve 92 and its other end may be terminated with a 5½ gallon polyethylene storage tank or drain to the ground.

A flexible hose 98 also has one end connected to the outlet port for drain valve 94 and its other end terminating in a 5½ gallon polyethylene storage tank 90. Opening drain valves 92 and 94 allows residual AFFF concentrate/water/dye-water from multi-metering manifold valve 62 to drain through drain valves 92 and 94 into storage tank 90.

A 1½ inch ID flexible hose 100 has one of its ends connected to the hose connector 47 for ball valve 48 by hose connector fitting 44. The other end of flexible hose 100 terminates in storage tank 90. When it is required to drain AFFF concentrate from the fire fighting vehicle's foam delivery system 46, opening ball valve 48 allows flow of residual AFFF concentrate through the ball valve 48 and flexible hose 100 into storage tank 90.

The T1500 fire fighting vehicle has a water tank 113 which connected to the AFFF concentrate's flow line pipe 60 by a flush line 112. Flush line 112 consist of a 1½ inch IPS pipe and a ball valve 114 with a pneumatic actuator 116.

The T1500 fire fighting vehicle also has a system for providing foam concentrate to AFFF tank 50 and draining foam concentrate from tank 50. A ball valve 104 with hose connector located on the right side of the vehicle and flow pipes 102 and 110 connect the T1500 fire fighting vehicle's foam storage tank to flow line pipe 60. A ball valve 106 with hose connector located on the left side of the vehicle and flow pipe 110 also connect the T1500 fire fighting vehicle's foam storage tank to flow line pipe 60. As is best indicated by arrows 59 and 108 flow of foam concentrate is both to foam tank 50 from the T1500 fire fighting vehicle's left and right side via ball valves 104 and 106 and from foam tank

50 to the T1500 fire fighting vehicle's left and right side via ball valves 104 and 106 (drain process).

Multi-metering manifold valve 62 allows for multiple flow rates of AFFF concentrate or fluorescent yellow/green or any other color dye-water through the valve.

When the user, for example, desires to test (for a 3% AFFF concentration) the roof turret nozzle 236 (FIG. 6) on the fire fighting vehicle at a low flow rate, the manifold valve 62 is set such that the water flow rate is 375 GPM which equates to flow rate of 22.5 GPM of AFFF concentrate through the valve 62. When the user desires to test (for a 3% AFFF concentration) the roof turret nozzle 236 on the fire fighting vehicle at a high flow rate, the manifold valve 62 is set such that the water flow rate is 750 GPM which equates to flow rate of 45 GPM of AFFF concentrate through the manifold valve 62.

Similarly, when the user desires to test (for a 3% AFFF concentration) a bumper turret nozzle 240 (FIG. 6) on the fire fighting vehicle, the manifold valve 62 is set such that the water flow rate is 300 GPM which equates to flow rate of 18 GPM of AFFF concentrate through the manifold valve 62.

Further, when the user desires to test (for a 3% AFFF concentration) the left handline nozzle or the right handline nozzle on the fire fighting vehicle, the manifold valve 62 is set such that the water flow rate is 60 GPM which equates to flow rate of 1.8 GPM of AFFF concentrate through the valve 62. When the user desires to test (for a 3% AFFF concentration) the undertruck nozzle, the flow rate through manifold valve 62 is 0.5 GPM of AFFF concentrate through valve 62 for a water flow rate of 17 GPM.

At this time, it should be noted that the multi-metering manifold valve 62 (FIG. 3) for the T3000 fire fighting vehicle and the multi-metering manifold valve 166 (FIG. 4) for the P23 fire fighting vehicle operate in exactly the same manner as the multi-metering manifold valve 62 (FIG. 2) for the T1500 fire fighting vehicle.

In operation, NoFoam system 10 provides a fluid path to drain foam concentrate from the foam distribution piping of the T1500 fire fighting vehicle which is collected into the 5½ gallon polyethylene bottle 90. A 4 gallon polyethylene bottle can be used in place of a 5½ gallon bottle. Further, the residual foam concentrate within low points in the T1500 foam distribution piping is collected into either or 4 gallon or 5½ gallon bottles by opening ball valve 94 and allowing the residual foam concentrate to flexible hoses 89 and 98 into the bottles 90.

The drained fluids are then recycled into the fire fighting vehicle or disposed of in accordance with federal, state and local environmental regulations.

When using the NoFoam system 10, an isolation valve 53 located in flow line pipe 60 is installed to isolate the vehicle's water tank 113. This isolation is required to isolate foam tank 50 during the T1500 foam distribution system checks since the vehicle's foam system is used during the NoFoam system vehicle foam distribution checks.

Figure 3:
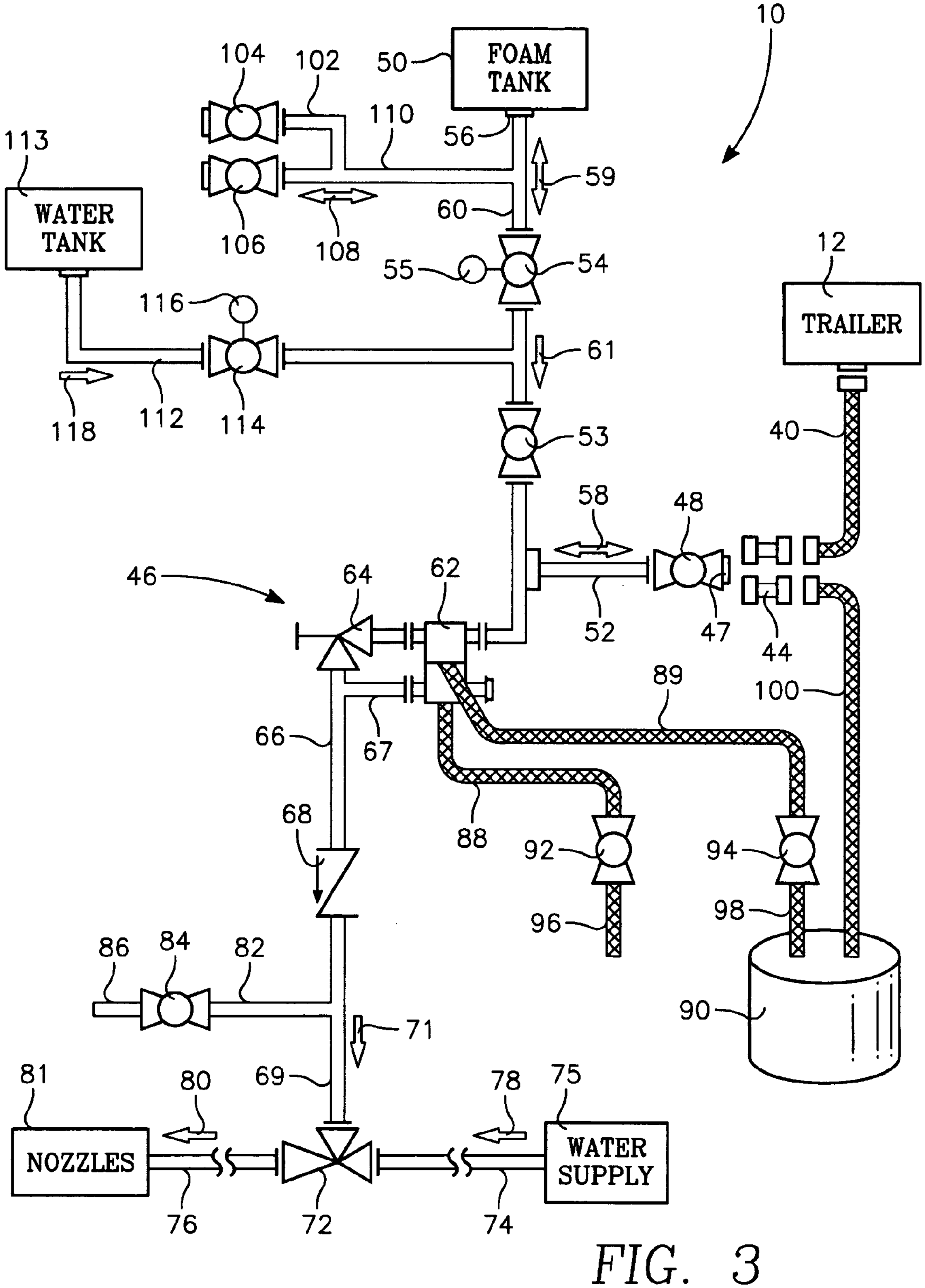
FIG. 3 illustrates a detailed fluid flow schematic diagram of the NoFoam system for the testing of a foam delivery system on a T3000 fire fighting vehicle.

Referring to FIGS. 1, 2 and 3, the T3000 fire fighting vehicle's foam delivery system 46 is identical to the T1500 foam delivery system except for the AFFF concentrate's flow line pipe 60. Flow line pipe 60 is a 3 inch IPS pipe.

At this time it should be noted that the valves 48, and 53 are the valves added to the T1500 and T3000 fire fighting vehicles' foam delivery systems 46, and the lines 52, and 60 between valve 54 and multi-metering manifold valve 62 are the flow lines added to delivery system 46 for the purpose of testing the vehicle foam concentrate delivery systems.

Figure 4:
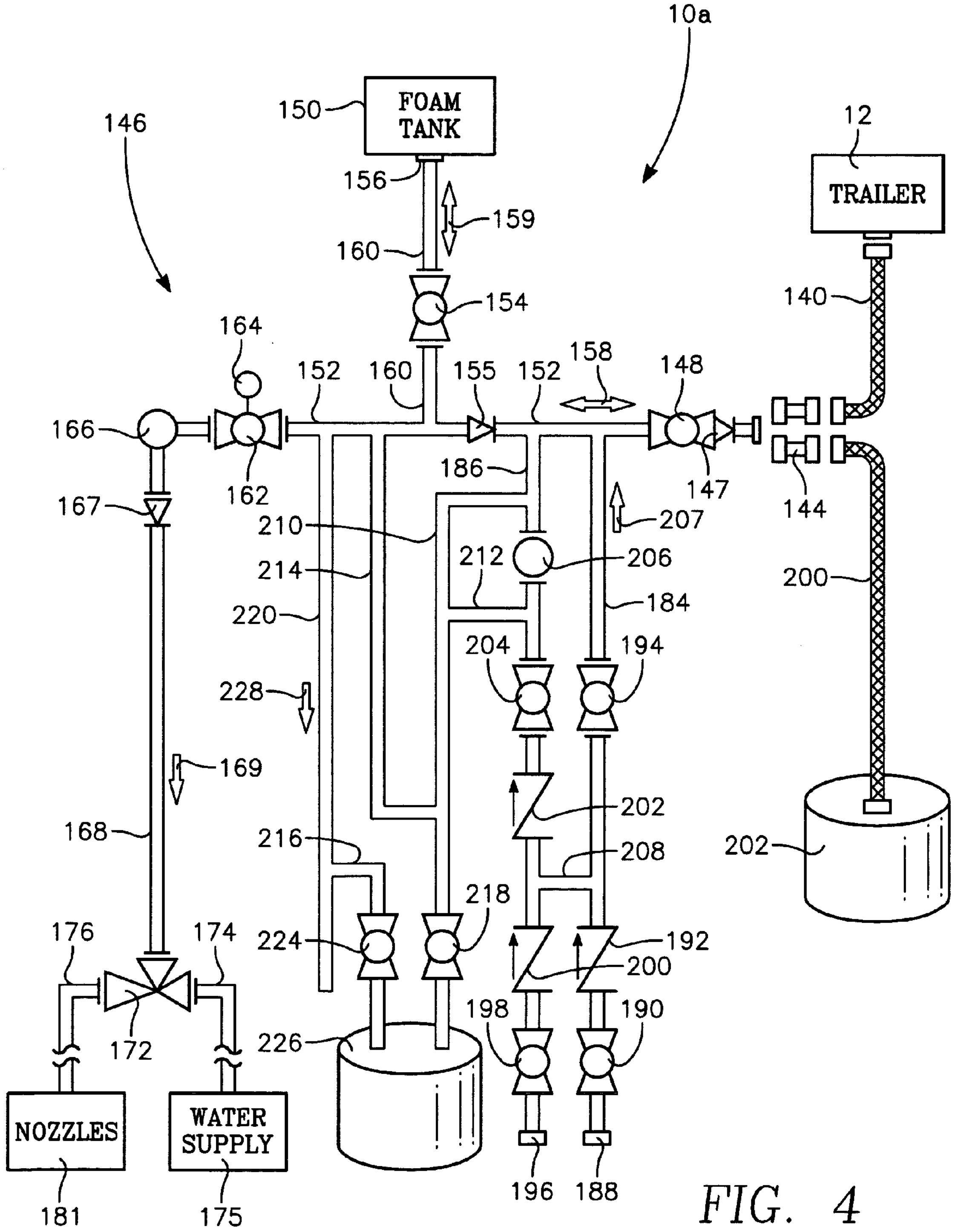
FIG. 4 illustrates a detailed fluid flow schematic diagram of the NoFoam system for the testing of a foam delivery system on a P23 fire fighting vehicle.

Referring to FIGS. 1 and 4, FIG. 4 depicts the P23 fire fighting vehicle's foam delivery system 146 with a NoFoam System to test foam delivery system 146 using the environmentally safe fluorescent yellow/green dye provided by trailer 12. One end of a flexible hose 140 is connected to the hose connector 36 for valve 34. Flexible hose 140 is a 1½ inch ID hose.

The other end of flexible hose 140 is connected to a 2 inch IPS×1½ inch IPS reducer 147 for a ball valve 148 by a hose connector fitting 144. Ball valve 148 is also connected to a flow pipe 152 which includes a 2½ inch×2 inch reducer 155. Reducer 155 connects flow pipe 152 to the AFFF concentrate's flow line pipe 160. Flow line pipe 160 is a 2½ inch IPS pipe. The other end of flow pipe 160 is connected to storage tank 150. Storage tank 150, which is the storage tank for AFFF concentrate on the P23 fire fighting vehicle, has at its bottom end a discharge port 156 through which AFFF concentrate flows when a ball valve 154 is open.

Ball valve 148 is a manually operated valve and is a valve which when open operates as a fill valve or a drain valve. When valve 148 is operating as a fill valve, dye concentrate under pressure is flowing from tank 14 through valve 148 to nozzles 181 for the P23 fire fighting vehicle being tested. When valve 148 is operating as a drain valve, valve 148 is used to drain AFFF concentrate from the AFFF tank 150. An arrow 158 indicates that fluid flow through pipe 152 is in both directions. When valve 148 is operating as a drain valve foam concentrate flows from tank 150 through flow pipe 160 and flow pipe 152 to a 1½ inch ID flexible hose 200.

Flexible hose 200 has one of its ends connected to the reducer 147 for ball valve 148 by hose connector fitting 144. The other end of flexible hose 100 terminates at an AFFF concentrate storage tank 202. When it is required to drain AFFF concentrate from the fire fighting vehicle's foam delivery system 146, opening ball valve 148 allows flow of residual AFFF concentrate through the ball valve 148 and flexible hose 200 into storage tank 202. Storage tank 202 may be either a 4 or a 5½ gallon polyethylene bottle.

The inlet port of a ball valve 162 with pneumatic operator 164 is connected to flow pipe 152 and the discharge port of valve 162 is connected to the inlet port for multi-metering manifold valve 166. The discharge port for valve 166 is connected to a 2½ inch×2 inch IPS reducer 167.

Multi-metering manifold valve 166 allows for multiple flow rates of AFFF concentrate or fluorescent yellow/green or any other color dye-water through the valve.

A 2 inch IPS flow pipe 168 connects reducer 167 to the first inlet port of an eductor 172. A 2 inch IPS water supply line 174 supplies water from a water supply tank 175 through a pump (not illustrated) to the second inlet port of eductor 172 which converts pressure to kinetic energy, creating a vacuum that sucks the AFFF concentrate/surrogate fluid from pipe 168 into the educator 172. The eductor 172 mixes the AFFF concentrate/surrogate fluid with the pressurized water discharging the mixture through the discharge port of eductor 172. A 3 inch IPS pipe 176 connects the discharge port of educator 172 to nozzles 181. Arrow 169 indicates the direction of fluid flow through the pipe 168.

Branching from flow pipe 152 are a pair of AFFF fill lines 184 and 186. Each flow line 184 and 186 consist of a 2" IPS flow pipe. Flow line 184 consist of an AFFF fill connector 188 for connecting a device supplying AFFF concentrate to the P23 fire fighting vehicle, a ball valve 190 positioned downstream from connector 188, a spring check valve 192 positioned downstream from ball valve 190 and a ball valve/fill valve 194 positioned downstream from check valve 192.

Flow line 186 consist of an AFFF fill connector 196 which also connects the device supplying AFFF concentrate to the P23 fire fighting vehicle, a ball valve 198 positioned downstream from connector 196, a spring check valve 200 positioned downstream from ball valve 198, a spring check valve 202 positioned downstream from check valve 200, a ball valve/fill valve 204 with hose connectors positioned downstream from check valve 202, and a gear pump 206 positioned downstream from ball valve 204. Connecting AFFF fill line 184 to AFFF fill line 186 is a 2 inch IPS flow pipe 208.

The direction of flow of AFFF concentrate to foam tank 150 through AFFF fill lines 184 and 186 is indicated by arrow 207.

Branching from AFFF fill line 186 is an AFFF drain line 210 which is ⅜ inch OD drain pipe. Drain line 210 includes a ball valve 218 and terminates at an AFFF concentrate storage tank 226. AFFF concentrate storage tank 226 may be either a 4 or a 5½ gallon polyethylene bottle.

Positioned between ball valve 204 and gear pump 206 is a secondary AFFF drain line 212 which connects fill line 186 to drain line 210. Branching from flow pipe 152 between ball valve 162 and reducer 155 is AFFF drain line 214 which also connects flow pipe 152 to drain line 210. A AFFF drain line 220 also branches from flow pipe 152 between ball valve 162 and reducer 155. Drain line 220 terminates at a drain manifold which is not shown.

A AFFF drain line 216 connects drain line 220 to the storage tank 226. Drain line 216 includes a ball valve 224. Drain lines 212, 214 and 216 are each ⅜ inch OD drain pipes while drain line 220 is a ½ inch OD drain pipe.

The direction of fluid flow in AFFF drain line 214, AFFF drain line 210 and AFFF drain line 216 is indicated by arrow 228.

At this time it should be noted that the valves 194, 204, 218 and 224 are the valves added to the P23 fire fighting vehicle's foam delivery system 146, and the lines 210, 212, 214 and 216 are the drain lines added to delivery system 146 for the purpose of testing the vehicle foam concentrate delivery system.

Figure 5:
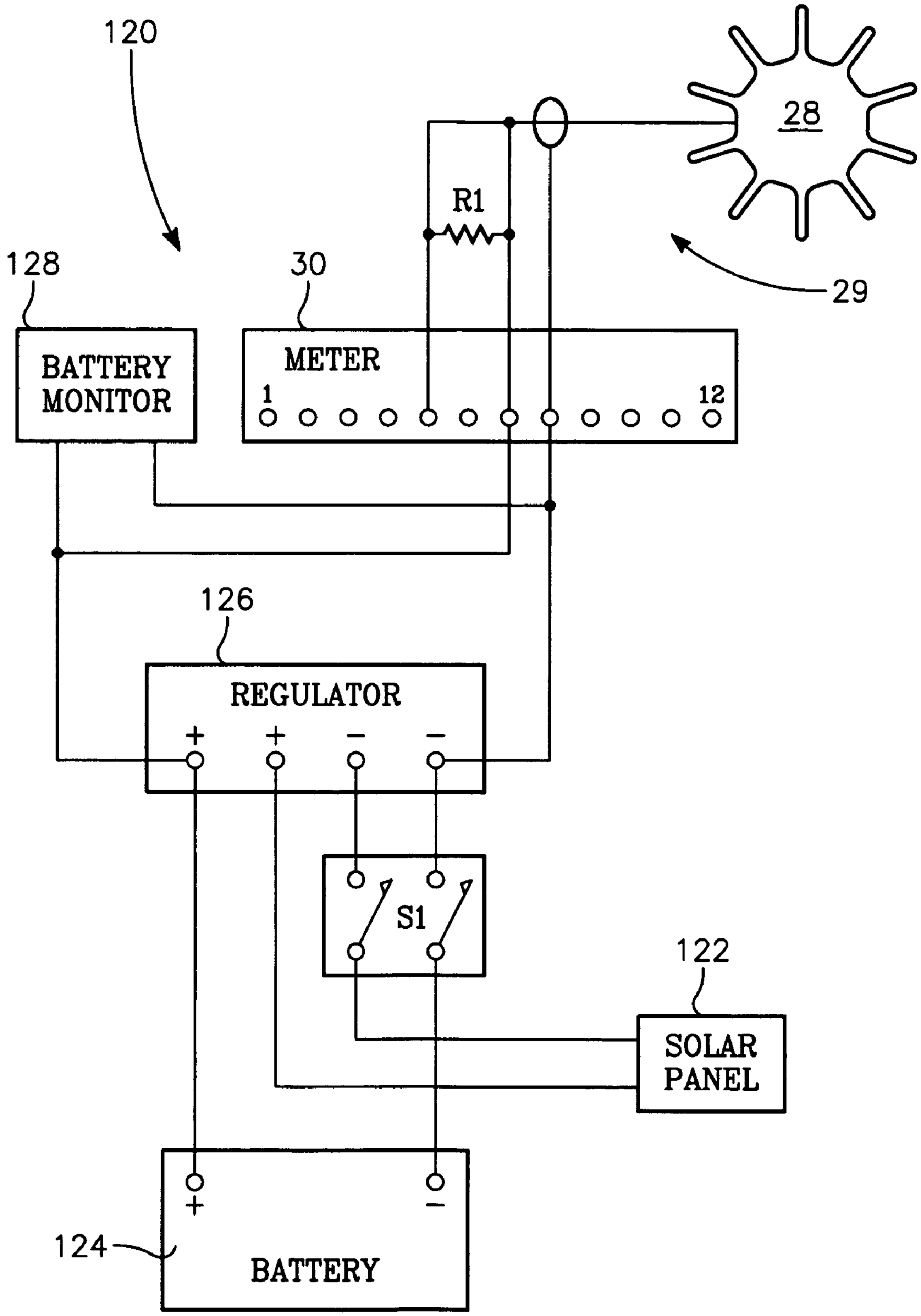
FIG. 5 illustrates a schematic diagram of the electrical circuit for the NoFoam system of FIGS. 1, 2, 3, 4 and 5.

Referring to FIGS. 1, 2, 3, 4 and 5, there is shown in FIG. 5 the electrical control panel 120 for the NoFoam system 10 of FIGS. 1, 2, 3 and 4. Fluid flow meter 29 of FIG. 1 includes paddle wheel flow transmitter 28 which is electrically connected to the flow indicator/rate meter 30 for fluid flow meter 29. Paddle wheel flow transmitter 28 transmits a 4 to 20 ma (milliamp) signal that is read by flow indicator/rate meter 30. Rate meter 30 is a digital meter located on control panel 120. The control panel 120 include a switch S1, a 12 Volt battery 124, and a voltage regulator 126. The positive terminal of the battery 124 is electrically connected to a positive terminal on the voltage regulator 126, while the negative terminal of battery 124 is connected through switch S1 to a negative terminal on voltage regulator 126. There is a solar panel 122 mounted on control panel 120. The solar panel 122 is connected to a second positive terminal on the voltage regulator 126 and is connected through switch S1 to a second negative terminal on voltage regulator 126. Panel 120 also includes a battery monitor 128 for monitoring output voltage. Battery monitor 128 is connected to the positive and negative terminals on voltage regulator 126. Resistor R1 is a 10 K-ohm resistor. Since the output voltage of solar panel 122 and battery 124 varies over time, voltage regulator 126 was included with the control panel 120 to insure that there is a constant voltage supplied to meter 30. Switch S1 allows a user to turn on and turn off the power to regulator 126 and meter 30.

Figure 6:
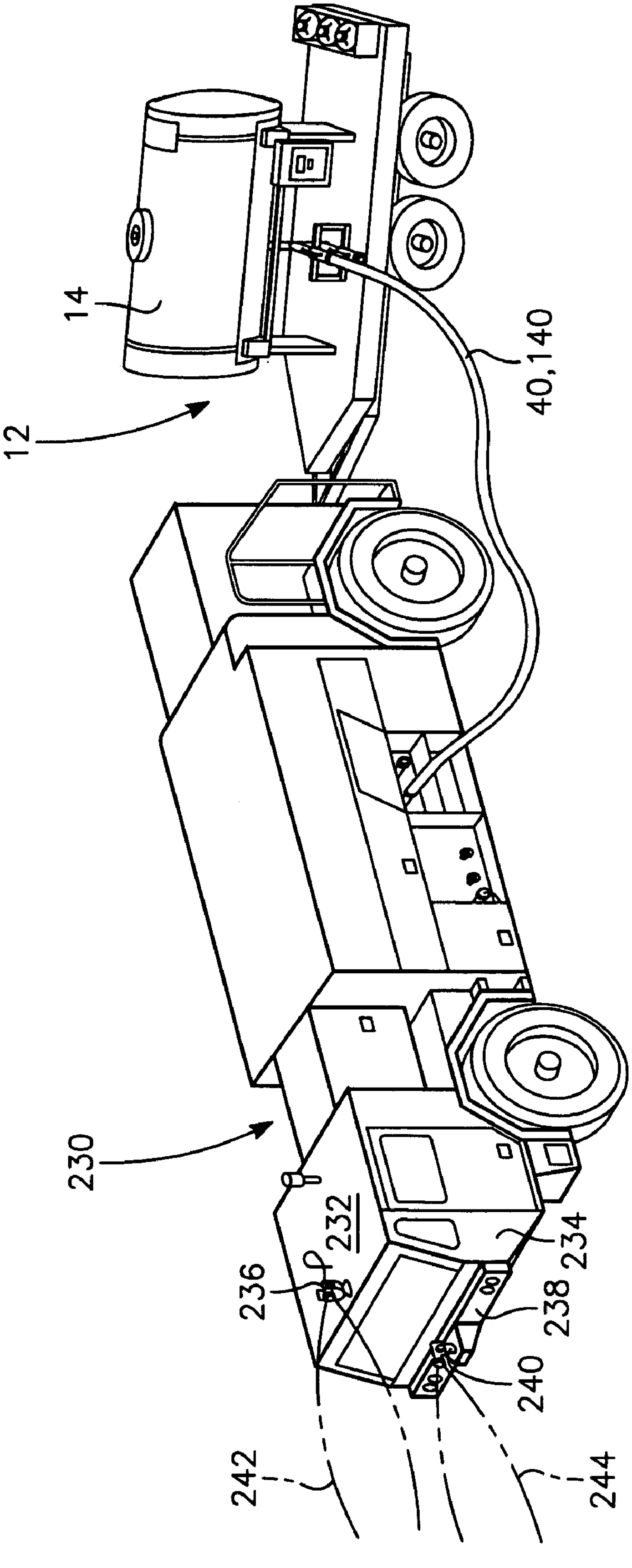
FIG. 6 illustrates the operation of the NoFoam system during a test of the foam delivery systems of FIGS. 1-4.

Referring to FIG. 6, FIG. 6 illustrates the stationary pad/trailer 12 and the 400 gallon water tank 14 mounted on the stationary pad/trailer 12 for the NoFoam System 10 depicted in FIGS. 1, 2, 3 and 4 for the T1500, T3000 and P23 fire fighting vehicles. FIG. 6 illustrates the T1500, T3000 and P23 fire fighting vehicles, designated generally by the reference numeral 230. The operation of the NoFoam system 10 during a test of the T1500, T3000 and P23 fire fighting vehicles, foam delivery system 46 and 146 is also depicted in FIG. 6. Positioned on the roof 232 of the driver's compartment 234 is the roof turret nozzle 236 for the fire fighting vehicle 230. Similarly, there is positioned on the front bumper 238, the bumper nozzle 240 for the fire fighting vehicle 230. When the foam delivery system 46 and 146 for fire fighting vehicle 230 is being tested a dye-water solution discharge/spray 242 is generated by roof turret nozzle 236 and dye-water solution discharge/spray 244 is generated by bumper nozzle 240. The sprays 242 and 244, which are yellow/green or another color, allow the user to visually inspect the operation of the foam delivery system 46 and 146, giving the fire fighter confidence in the fire fighting vehicle's performance.

Referring to FIGS. 1, 2, 3 and 5, the user when operating the NoFoam system 10 during testing of the T1500 and the T3000 fire fighting vehicles utilizes the following procedure with respect to trailer/stationary pad 12. The user first opens ball valve 20 and then fills 400 gallon water tank 14. In the alternative ball valve 20 could be closed and the tank filled through the top of the tank 14. The user adds the fluorescent yellow/green dye or any other color dye to the water and turns on the electrical panel 120 by closing switch S1.

With respect to the fire fighting vehicle and its fire fighting vehicle's foam delivery system 46, the user turns off the fire fighting vehicle and insures that the vehicle's air tanks are at their capacity of 120 PSI.

The user closes the ball valve 53 for AFFF concentrate tank 50. The user then connects flexible hose 100 to the hose connector 47 for ball valve 48 using connector fitting 44. The user next opens ball valve 48, which allows AFFF concentrate in the foam delivery system 46 to drain into polyethylene storage tank 90. The user next opens drain valve 94, also allowing AFFF concentrate in the foam delivery system 46 to drain into polyethylene storage tank 90. Draining the AFFF concentrate from delivery system 46 generally results in an accumulation of about 1½ gallons of AFFF concentrate into storage tank 90.

After draining delivery system 46 of AFFF concentrate the user closes drain valve 94, removes flexible hose 100. The user next attaches to the hose connector 47 of ball valve 48 one end of flexible hose 40 using 144 connector fitting 44 and then attaches the other end of flexible hose 40 to the hose connector 36 for ball valve 34. Finally, the user opens ball valve 34 on trailer/stationary-pad 12, and is now ready to begin testing the foam delivery system 46 for the T1500 or T3000 fire fighting vehicle.

To start the nozzle discharge test for the T1500 or T3000 fire fighting vehicle the user starts the fire fighting vehicle, goes through normal foam discharge test and sets the agent selector valve for the fire fighting vehicle to the "FOAM" position. The user next opens the station nozzle valve for the roof nozzle, bumper nozzle, hand line nozzle, the under truck nozzle or any combination thereof to be tested. The user reads the flow indicator/rate meter 30 for fluid flow meter 29, a water pressure pump gage which indicates pressure of the foam delivery system 46 and the elapsed time. This information allows the user to determine the effectiveness of the foam delivery system 46 for the fire fighting vehicle.

For the P23 fire fighting vehicle the procedure is similar with the user first draining foam concentrate by closing valve 154 for AFFF concentrate tank 150. The user then connects flexible hose 200 to the reducer/hose connector 147 for ball valve 148 using hose connector 144. The user next opens ball valve 148, which allows AFFF concentrate in the foam delivery system 146 to drain into polyethylene storage tank 202.

The user next opens drain valves 218 and 224 and closes valves 194 and 204, also allowing AFFF concentrate in the foam delivery system 146 to drain into polyethylene storage tank 226. Draining the AFFF concentrate from delivery system 146 generally results in an accumulation of about 1½ gallons of AFFF concentrate into storage tank 226.

From the foregoing, it is readily apparent that the present invention comprises a new, unique, and exceedingly useful NoFoam system for testing an aqueous film forming foam delivery system on a fire fighting vehicle which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A method for an environmentally safe testing of a foam delivery system on a fire fighting vehicle, comprising the steps of:

(a) providing a mobile platform adapted for movement to a location having said fire fighting vehicle, said mobile platform including a surrogate fluid storage tank and a ball valve connected to said surrogate fluid storage, said surrogate fluid storage tank containing an environmentally safe surrogate fluid;

(b) transporting said mobile platform to the location of said fire fighting vehicle to conduct a test of the foam delivery system on said fire fighting vehicle;

(c) connecting one end of a flexible hose to the ball valve of said mobile platform;

(d) connecting an opposite end of said flexible hose to a first ball valve located on said fire fighting vehicle, said first ball valve operating as a bi-directional flow valve for testing the foam delivery system on said fire fighting vehicle;

(e) closing a second ball valve located on said fire fighting vehicle to prevent Aqueous Film Forming Foam (AFFF) from a foam tank on said fire fighting vehicle from passing through said second ball valve into the foam delivery system on said fire fighting vehicle;

(f) opening the ball valve of said mobile platform and the first ball valve on said fire fighting vehicle allowing said surrogate fluid to flow from said surrogate fluid storage tank into the foam delivery system on said fire fighting vehicle;

(g) controlling a flow rate of said surrogate fluid through said foam delivery system, the flow rate of said surrogate fluid through said foam delivery being controlled by a multi-metering manifold valve connected to the first ball valve on said fire fighting vehicle;

(h) providing an environmentally safe pressurized liquid to the foam delivery system on said fire fighting vehicle;

(i) mixing said surrogate fluid with said pressurized liquid to form a surrogate fluid mixture under pressure, said surrogate fluid mixture being formed by an educator located on said fire fighting vehicle and connected to said multi-metering manifold valve;

(j) providing said surrogate fluid mixture to a plurality of nozzles located on said fire fighting vehicle under pressure testing each of said plurality of nozzles with said surrogate fluid mixture; and (k) measuring the flow rate of said surrogate fluid from said surrogate fluid storage tank with a flow sensor located on said mobile platform.

2. The method of claim 1 wherein said surrogate fluid mixture comprises a fluorescent yellow green dye which is an environmentally benign, biodegradable dye.

3. The method of claim 1 wherein said flow sensor includes a paddle wheel flow transmitter connected to said surrogate fluid storage tank and a flow indicator electrically connected to said paddle wheel flow transmitter, said flow indicator providing a measurement of the flow rate of said surrogate fluid through the paddle wheel flow transmitter of said flow sensor.

4. The method of claim 3 wherein said flow indicator is connected to a source of power for said flow sensor, said source power for said flow sensor consisting of a voltage regulator connected to said flow indicator, and a solar panel and a battery connected to said voltage regulator.

5. The method of claim 1 wherein the flow rate of said surrogate fluid through said multi-metering manifold valve is between about 18 GPM and about 45 GPM.

6. The method of claim 1 wherein said surrogate fluid storage tank containing an environmentally safe surrogate fluid comprises a 400 gallon water tank mounted said mobile platform.

7. A method for an environmentally safe testing of a foam delivery system on a fire fighting vehicle, comprising the steps of:

(a) providing a mobile platform adapted for movement to a location having said fire fighting vehicle, said mobile platform including a surrogate fluid storage tank and a ball valve connected to said surrogate fluid storage, said surrogate fluid storage tank containing an environmentally safe surrogate fluid;

(b) transporting said mobile platform to the location of said fire fighting vehicle to conduct a test of the foam delivery system on said fire fighting vehicle;

(c) connecting one end of a flexible hose to the ball valve of said mobile platform;

(d) connecting an opposite end of said flexible hose to a first ball valve located on said fire fighting vehicle, said first ball valve operating as a bi-directional flow valve for testing the foam delivery system on said fire fighting vehicle;

(e) closing a second ball valve located on said fire fighting vehicle to prevent Aqueous Film Forming Foam (AFFF) from a foam tank on said fire fighting vehicle from passing through said second ball valve into the foam delivery system on said fire fighting vehicle;

(f) opening the ball valve of said mobile platform and the first ball valve on said fire fighting vehicle allowing said surrogate fluid to flow from said surrogate fluid storage tank into the foam delivery system on said fire fighting vehicle;

(g) controlling a flow rate of said surrogate fluid through said foam delivery system, the flow rate of said surrogate fluid through said foam delivery being controlled by a multi-metering manifold valve connected to the first ball valve on said fire fighting vehicle;

(h) providing an environmentally safe pressurized liquid to the foam delivery system on said fire fighting vehicle;

(i) mixing said surrogate fluid with said pressurized liquid to form a surrogate fluid mixture under pressure, said surrogate fluid mixture being formed by an educator located on said fire fighting vehicle and connected to said multi-metering manifold valve;

(j) providing said surrogate fluid mixture to a plurality of nozzles located on said fire fighting vehicle under pressure testing each of said plurality of nozzles with said surrogate fluid mixture;

(k) measuring the flow rate of said surrogate fluid from said surrogate fluid storage tank with a flow sensor located on said mobile platform;

(l) connecting one end of a flexible drain hose to the first ball valve on said fire fighting vehicle prior to testing the foam delivery system on said fire fighting vehicle;

(m) providing a polyethylene storage tank at an opposite end of said flexible drain hose; and (n) opening the first ball valve on said fire fighting vehicle to drain said Aqueous Film Forming Foam from said foam delivery system prior to testing said foam delivery system.

8. The method of claim 7 further comprising the step of providing a check valve having an inlet port connected to said multi-metering manifold valve and an outlet port connected to said eductor, said check valve insuring that fluid flow of said surrogate fluid therethrough is in one direction from said multi-metering manifold valve to said eductor.

9. The method of claim 7 wherein said surrogate fluid mixture comprises a fluorescent yellow green dye which is an environmentally benign, biodegradable dye.

10. The method of claim 7 wherein said flow sensor includes a paddle wheel flow transmitter connected to said surrogate fluid storage tank and a flow indicator electrically connected to said paddle wheel flow transmitter, said flow indicator providing a measurement of the flow rate of said surrogate fluid through the paddle wheel flow transmitter of said flow sensor.

11. The method of claim 7 wherein said flow indicator is connected to a source of power for said flow sensor, said source power for said flow sensor consisting of a voltage regulator connected to said flow indicator, and a solar panel and a battery connected to said voltage regulator.

12. The method of claim 7 wherein said surrogate fluid storage tank containing an environmentally safe surrogate fluid comprises a 400 gallon water tank mounted said mobile platform.

13. The method of claim 7 wherein the flow rate of said surrogate fluid through said multi-metering manifold valve is between about 18 GPM and about 45 GPM.

14. A method for an environmentally safe testing of a foam delivery system on a fire fighting vehicle, comprising the steps of:

(a) providing a mobile platform adapted for movement to a location having said fire fighting vehicle, said mobile platform including a surrogate fluid storage tank and a ball valve connected to said surrogate fluid storage, said surrogate fluid storage tank containing an environmentally safe surrogate fluid;

(b) transporting said mobile platform to the location of said fire fighting vehicle to conduct a test of the foam delivery system on said fire fighting vehicle;

(c) connecting one end of a flexible hose to the ball valve of said mobile platform;

(d) connecting an opposite end of said flexible hose to a first ball valve located on said fire fighting vehicle, said first ball valve operating as a bi-directional flow valve for testing the foam delivery system on said fire fighting vehicle;

(e) closing a second ball valve located on said fire fighting vehicle to prevent Aqueous Film Forming Foam. (AFFF) from a foam tank on said fire fighting vehicle from passing through said second ball valve into the foam delivery system on said fire fighting vehicle;

(f) opening the ball valve of said mobile platform and the first ball valve on said fire fighting vehicle allowing said surrogate fluid to flow from said surrogate fluid storage tank into the foam delivery system on said fire fighting vehicle;

(g) controlling a flow rate of said surrogate fluid through said foam delivery system, the flow rate of said surrogate fluid through said foam delivery being controlled by a multi-metering manifold valve connected to the first ball valve on said fire fighting vehicle;

(h) providing an environmentally safe pressurized liquid to the foam delivery system on said fire fighting vehicle;

(i) mixing said surrogate fluid with said pressurized liquid to form a surrogate fluid mixture under pressure, said surrogate fluid mixture being formed by an educator located on said fire fighting vehicle and connected to said multi-metering manifold valve;

(j) providing said surrogate fluid mixture to a plurality of nozzles located on said fire fighting vehicle under pressure testing each of said plurality of nozzles with said surrogate fluid mixture;

(k) providing a check valve having an inlet port connected to said multi-metering manifold valve and an outlet port connected to said educator, said check valve insuring that fluid flow of said surrogate fluid therethrough is in one direction from said multi-metering manifold valve to said eductor;

(l) measuring the flow rate of said surrogate fluid from said surrogate fluid storage tank with a flow sensor located on said mobile platform;

(m) connecting one end of a first flexible drain hose to the first ball valve on said fire fighting vehicle prior to testing the foam delivery system on said fire fighting vehicle;

(n) providing a polyethylene storage tank at an opposite end of said first flexible drain hose;

(o) connecting one end of a second flexible drain hose to said multi-metering manifold valve prior to testing the foam delivery system on said fire fighting vehicle;

(p) terminating an opposite end of said second flexible drain hose at said polyethylene storage tank;

(q) providing a drain valve within said second flexible drain hose; and (r) opening the first ball valve on said fire fighting vehicle and the drain valve within said second flexible hose to drain said Aqueous Film Forming Foam from said foam delivery system prior to testing said foam delivery system.

15. The method of claim 14 wherein said surrogate fluid mixture comprises a fluorescent yellow green dye which is an environmentally benign, biodegradable dye.

16. The method of claim 14 wherein said flow sensor includes a paddle wheel flow transmitter connected to said surrogate fluid storage tank and a flow indicator electrically connected to said paddle wheel flow transmitter, said flow indicator providing a measurement of the flow rate of said surrogate fluid through the paddle wheel flow transmitter of said flow sensor.

17. The method of claim 14 wherein said flow indicator is connected to a source of power for said flow sensor, said source power for said flow sensor consisting of a voltage regulator connected to said flow indicator, and a solar panel and a battery connected to said voltage regulator.

18. The method of claim 14 wherein said surrogate fluid storage tank containing an environmentally safe surrogate fluid comprises a 400 gallon water tank mounted said mobile platform.

19. The method of claim 14 wherein the flow rate of said surrogate fluid through said multi-metering manifold valve is between about 18 GPM and about 45 GPM.

20. The method of claim 14 further comprising the steps of:

(a) connecting one end of a third flexible drain hose to said multi-metering manifold valve; and (b) providing a drain valve within said third flexible drain hose.

* * * * *